United States Patent Office 3,401,619
Patented Sept. 17, 1968

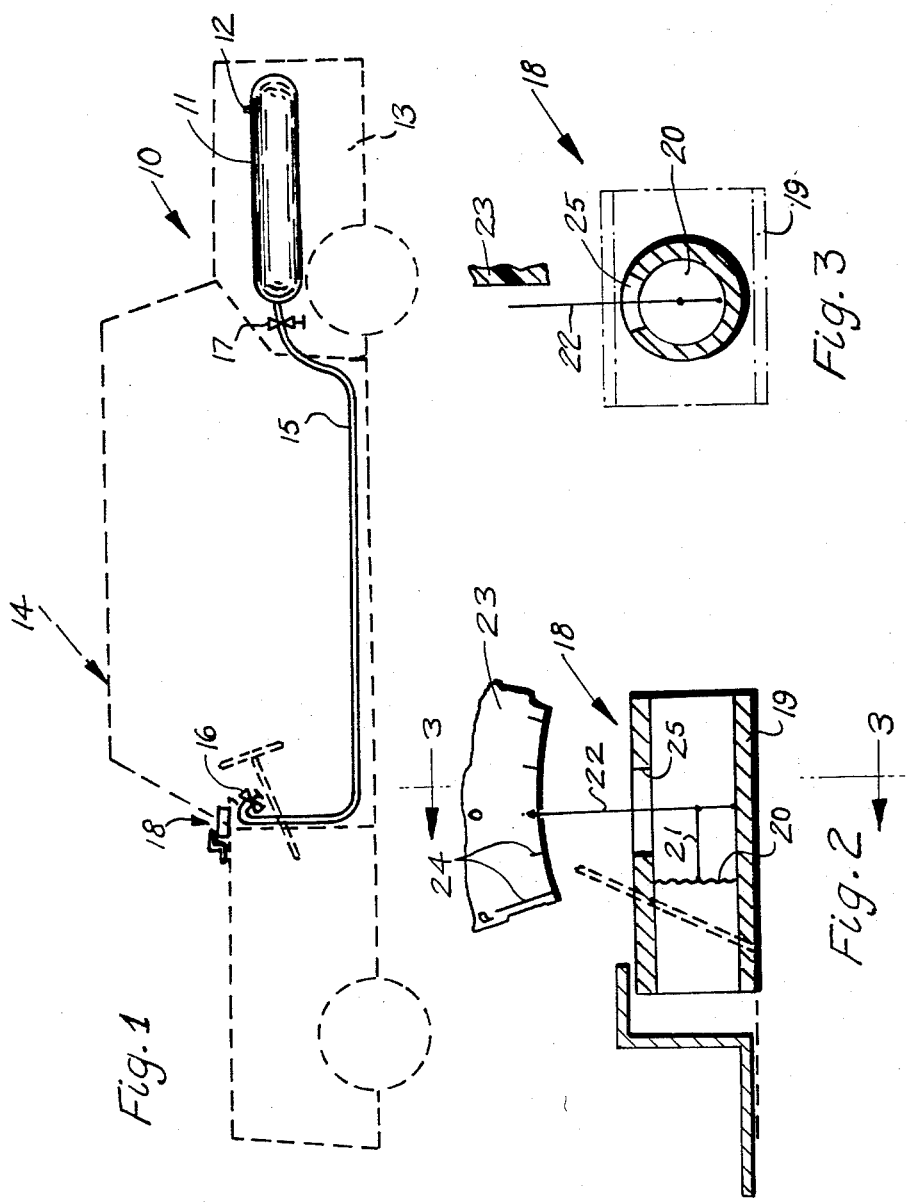

3,401,619
PRESSURIZED AIR SYSTEM FOR
MOTOR VEHICLES
Gene E. Sotory, Jersey City, N.J. (8200 Kennedy Blvd. E.,
Apt. 18J, North Bergen, N.J. 07047)
Filed Mar. 22, 1967, Ser. No. 625,187
1 Claim. (Cl. 98—1.5)

ABSTRACT OF THE DISCLOSURE

A pressurized air system for motor vehicles having a compressed air tank, a feed line, a control valve and a pressure indicator. This pressurized air system is primarily for those having allergies such as due to pollen, dust and so on, the pressurized air system preventing air outside of the vehicle containing pollen and so on from entering the passenger compartment of the vehicle.

This invention relates to pressurized environmental systems, and more particularly to a pressurized air system for passenger compartments of motor vehicles.

It is therefore the main purpose of this invention to provide a pressure clean air system for motor vehicles which will serve to keep out pollen, dust, carbon monoxide and various types of foul odors that are sometimes encountered when passing through certain types of terrain.

Another object of this invention is to provide a pressurized clean air system for motor vehicles which will continuously maintain a slight over pressure which will prevent air of atmospheric pressure from entering the passenger compartment of the vehicle. The over pressure forcing the air out of the passenger compartment thus eliminating the entry of any outside air, dust, odor, pollen or other air pollution products.

Still another object of this invention is to provide a pressurized clean air system for motor vehicles which will keep dangerous gases out of the passenger compartment as well as unpleasant odors and the system will have a compressed air tank with a safety valve and a control valve contained within the piping of the system and diaphragm means within a pressure indicator will serve to indicate the p.s.i. within the passenger compartment of motor vehicle.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing:

FIGURE 1 is a side view of the present invention showing it installed within a vehicle which is shown in phantom lines;

FIGURE 2 is a fragmentary front view of the pressure indicator shown in section and in elevation;

FIGURE 3 is a cross-sectional view taken along the lines 3—3 of FIGURE 2.

According to this invention, a pressurized clean air system for motor vehicles 10 is provided with an elongated compressed air tank 11 which is secured in a suitable manner.

Tank 11 is provided with a filler valve 12 that is secured in the trunk area 13 of the vehicle 14. A pipe 15 secured to tank 11 is provided with a control valve 16 and a valve 17 within pipe 15 near the forward end of tank 11 provides a safety shut-off for system 10. A pressure indicator 18 provides a means for the driver to observe quickly at a glance what the pressure in pounds per square inch is in the vehicle at all times. Indicator 18 is provided with a sleeve 19 which is opened at both ends and a diaphragm 20 is secured within sleeve 19. Diaphragm 20 is provided with a link 21 which is secured to needle 22. Needle 22 provides a means of indicating air pressure along the dial 23 having a plurality of graduations 24 to indicate various air pressures. Needle 22 is free to pivot within opening 25 of sleeve 19 when air under pressure moves the flexible diaphragm 20 secured within sleeve 19.

As shown in FIG. 1 of the drawing, it is to be noted that the indicator 18 is mounted upon the vehicle in a manner so that one open end of the sleeve 19 extends into the passenger compartment of the vehicle, while the other open end of the sleeve protrudes outwardly of the passenger compartment so that the pressure within the passenger compartment may be compared to the air pressure externally of the vehicle. Thus the variation in pressure will cause the needle 22 to be moved respective to the dial 23.

It will be noted that air is allowed to escape from within the vehicle while system 10 is in operation.

What I now claim is:

1. A pressurized clean air system for motor vehicles, comprising in combination, a compressed air tank, a feed line pipe, a control valve and a main safety valve, and pressure indicating means, said pipe being secured to said tank and providing passage way for air under pressure to the forward portion of the passenger compartment of the vehicle where the control valve is located, said control valve being installed in said pipe within reach of the driver of the vehicle, said pressure indicator being secured above said control valve in the foward area of the passenger compartment and being provided with an open ended sleeve which is open at each opposite end, a diaphragm secured transversely within said sleeve and being connected by linkage means to a needle which is pivotable to read air in pounds per square inch upon a dial mounted upon said indicator, said sleeve being provided with an opening along the side thereof through which said needle extends so that the outer end thereof is in alignment with said dial and thus indicating air pressure upon said dial of said indicator, and one open end of said sleeve communicating with said passenger compartment, the opposite end of said sleeve extending outwardly of said passenger compartment whereby air pressure may be varied upon opposite sides of said diaphragm so to cause said needle to pivot.

References Cited

UNITED STATES PATENTS 1,461,700   7/1923   Nichols _____ 98—1.5

MEYER PERLIN, *Primary Examiner.*